April 20, 1954  E. E. KING  2,675,568
RETRIEVER FOR SUBMERGED ARTICLES
Filed Aug. 4, 1952

Edwin E. King
INVENTOR.

BY *Clarence A. O'Brien*
*and Harvey B. Jackson*
Attorneys

Patented Apr. 20, 1954

2,675,568

UNITED STATES PATENT OFFICE 2,675,568

RETRIEVER FOR SUBMERGED ARTICLES

Edwin E. King, Midwest City, Okla.

Application August 4, 1952, Serial No. 302,483

2 Claims. (Cl. 9—9)

The present invention relates to new and useful improvements in devices for locating and retrieving submerged articles, such as fishing rods which have accidently fallen in the water.

An important object of the invention is to provide an automatically released buoy attached to the fishing rod and which rises to the surface of the water when the rod falls therein.

Another object is to provide a buoyant spool on which a retrieving line is wound and locking the spool to the rod by means of a soluble controlled catch mechanism which releases the spool upon contact of the soluble agent with water.

A further object is to provide a retrieving device of this character which may be attached as a unitary structure to a fishing rod without necessitating any changes or alterations in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
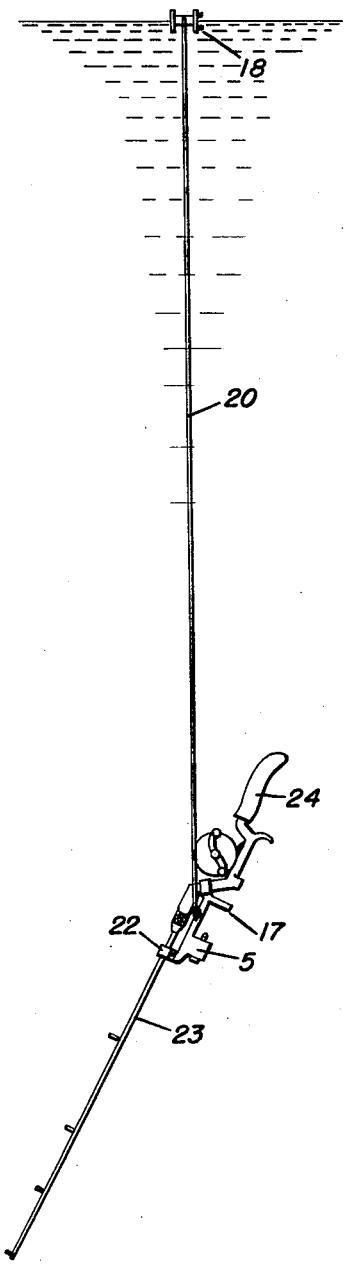
Figure 1 is a side elevational view showing the buoy released.
Figure 2:
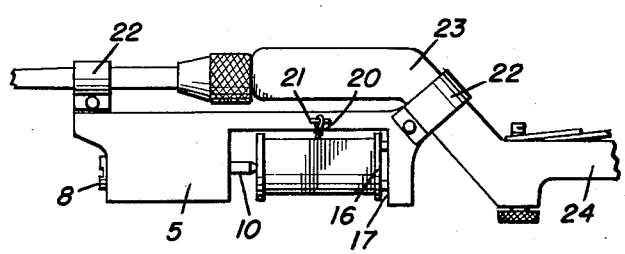
Figure 2 is an enlarged fragmentary side elevational view showing the retrieving device attached to the rod.
Figure 3:
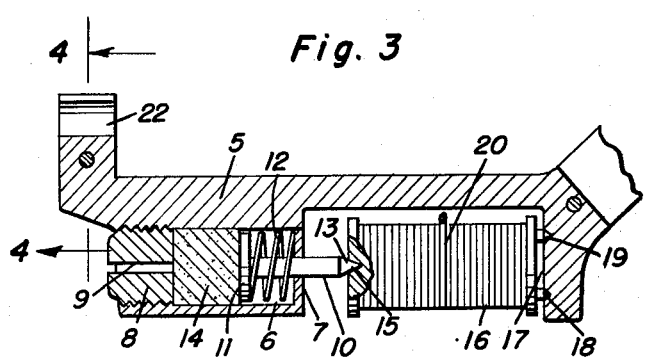
Figure 3 is a longitudinal sectional view of the retrieving device.
Figure 4:
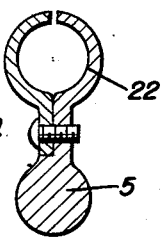
Figure 4 is a transverse sectional view taken on the line 4—4 of Figure 3.

Referring now to the drawings in detail, wherein for the purpose of illustration I have disclosed a preferred embodiment of my invention, the numeral 5 designates an elongated body having a cylindrical chamber 6 in one end portion which is closed at its inner end 7 and closed at its outer end by a threaded plug 8 having a passage 9 extending therethrough.

A plunger 10 is slidable in end 7 of the chamber with a flange or head 11 at the inner end of the plunger and a coil spring 12 is held compressed between the head 11 and end 7 of the chamber to retract the plunger. The outer end of plunger 10 is pointed as shown at 13. The plunger is held projected by means of a solid block of soluble substance 14 which may comprise a block of salt, gelatine or other suitable substance, placed in the chamber between plug 8 and head 11 of the plunger.

The pointed end 13 of plunger 10 projects into a recess 15 in one end of a buoyant spool 16 positioned in a recess 17 in body 5 and the other end of the spool is provided with a pair of prongs 18 which project into notches 19 formed in an adjacent portion of the body.

A cord 20 is wound on the spool with one end of the cord tied or otherwise secured to the spool and with the other end of the cord secured to a fastener 21 driven into the body.

The end portions of the body 5 are provided with a pair of clamps 22 adapted for attaching to a fishing rod 23 adjacent the handle 24 thereof.

In the operation of the device, soluble block 14 is placed in chamber 6 and retained therein by plug 8 and upon threading the plug inwardly the plunger is forced into spool 16 to hold the spool in recess 17 of the body. The spool is held from turning to prevent unwinding of the cord by the pair of prongs 18.

Should the fishing rod accidently drop into the water while fishing, the water will enter chamber 6 by way of passage 9 in plug 8 and dissolve the block 14 whereupon spring 12 will retract plunger 10 and release spool 16 which rises to the surface of the water while unwinding the cord. The spool then serves as a buoy to retrieve the rod.

Spring retractible plunger 10 and prongs 18 function as a catch mechanism to releasably hold the spool attached to the body.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A retrieving device for submerged portable objects, comprising a body attached to the object and having a chamber therein and also having a recess adjacent the chamber, a buoyant spool positioned in the recess and to which a retrieving line is attached and also attached to the body, catch means in the chamber and holding the spool in the recess, and a soluble member in the chamber and opposing releasing movement of the catch means, said catch means including a spring retracted plunger behind which the soluble member is positioned to hold the plunger in projected engagement with the spool.

2. A retrieving device for submerged portable objects comprising a body attached to the object and having a chamber therein and also having a recess adjacent the chamber, a buoyant spool positioned in the recess and to which a retrieving line is attached and also attached to the body, said recess having a notch therein and said spool having a protuberance at one end engaged in the notch, a spring retracted plunger in the chamber and having an outer end engaging the other end of the spool to lock the spool in the recess, a soluble member in the chamber behind the plunger, and a plug closing one end of the chamber and holding the soluble member against the plunger with the latter in its spool locking position, said plug having a passage to admit water into the chamber for dissolving the soluble member to release the spool.

References Cited in the file of this patent

UNITED STATES PATENTS

| Number | Name | Date |
|---|---|---|
| 1,860,327 | Kuhn | May 24, 1932 |
| 2,190,531 | Kaboskey et al. | Feb. 13, 1940 |
| 2,198,755 | Berndt | Apr. 30, 1940 |
| 2,261,513 | Donnerstog | Nov. 4, 1941 |
| 2,528,799 | Strong | Nov. 7, 1950 |
| 2,559,918 | Grieb | July 10, 1951 |